United States Patent [19]

Bierman et al.

[11] Patent Number: 4,816,241

[45] Date of Patent: * Mar. 28, 1989

[54] GASEOUS REDUCTION OF PHOSPHORIC ACID

[75] Inventors: Laurence W. Bierman; Samual M. Polinsky, both of Pocatello, Id.

[73] Assignee: J. R. Simplot Co., Pocatello, Id.

[*] Notice: The portion of the term of this patent subsequent to Jul. 24, 2001 has been disclaimed.

[21] Appl. No.: 465,021

[22] Filed: Feb. 14, 1983

Related U.S. Application Data

[63] Continuation-in-part of Ser. No. 349,026, Feb. 16, 1982, Pat. No. 4,461,746.

[51] Int. Cl.$^4$ ..................... C01B 25/16; C01G 43/00
[52] U.S. Cl. ..................... 423/321 R; 423/8; 423/10
[58] Field of Search ............ 423/6, 8, 9, 10, 316, 423/317, 321 R

[56] References Cited

U.S. PATENT DOCUMENTS

| | | |
|---|---|---|
| 3,214,239 | 10/1965 | Hazen et al. . |
| 3,711,591 | 1/1973 | Hurst et al. . |
| 3,720,755 | 3/1973 | Duyverman et al. ............... 423/321 |
| 3,966,873 | 6/1976 | Elikan et al. . |
| 4,105,741 | 8/1978 | Wiewiorowski et al. . |
| 4,180,545 | 12/1979 | McCullough et al. . |
| 4,202,860 | 5/1980 | Miyake et al. . |
| 4,241,027 | 12/1980 | Bowerman et al. . |
| 4,255,392 | 3/1981 | Chiang . |
| 4,302,247 | 11/1981 | Berry et al. . |
| 4,374,805 | 2/1983 | Worthington et al. ............. 423/321 |
| 4,394,360 | 7/1983 | Schrodter et al. .................. 423/317 |

*Primary Examiner*—Gregory A. Heller
*Attorney, Agent, or Firm*—Gregory O. Garmong

[57] ABSTRACT

A process for reducing the valence state of ferrous and other ions present in phosphoric acid by heating the acid in the presence of a pressurized reducing gas, preferably hydrogen. The pressurized gas reduces the ions without an addition of metallic iron or other impurity. This process is desirably used with processes for recovering uranium from wet process phosphoric acid, wherein ferric or uranyl ions in the phosphoric acid are reduced in a pressurized reducing gas.

11 Claims, 1 Drawing Sheet

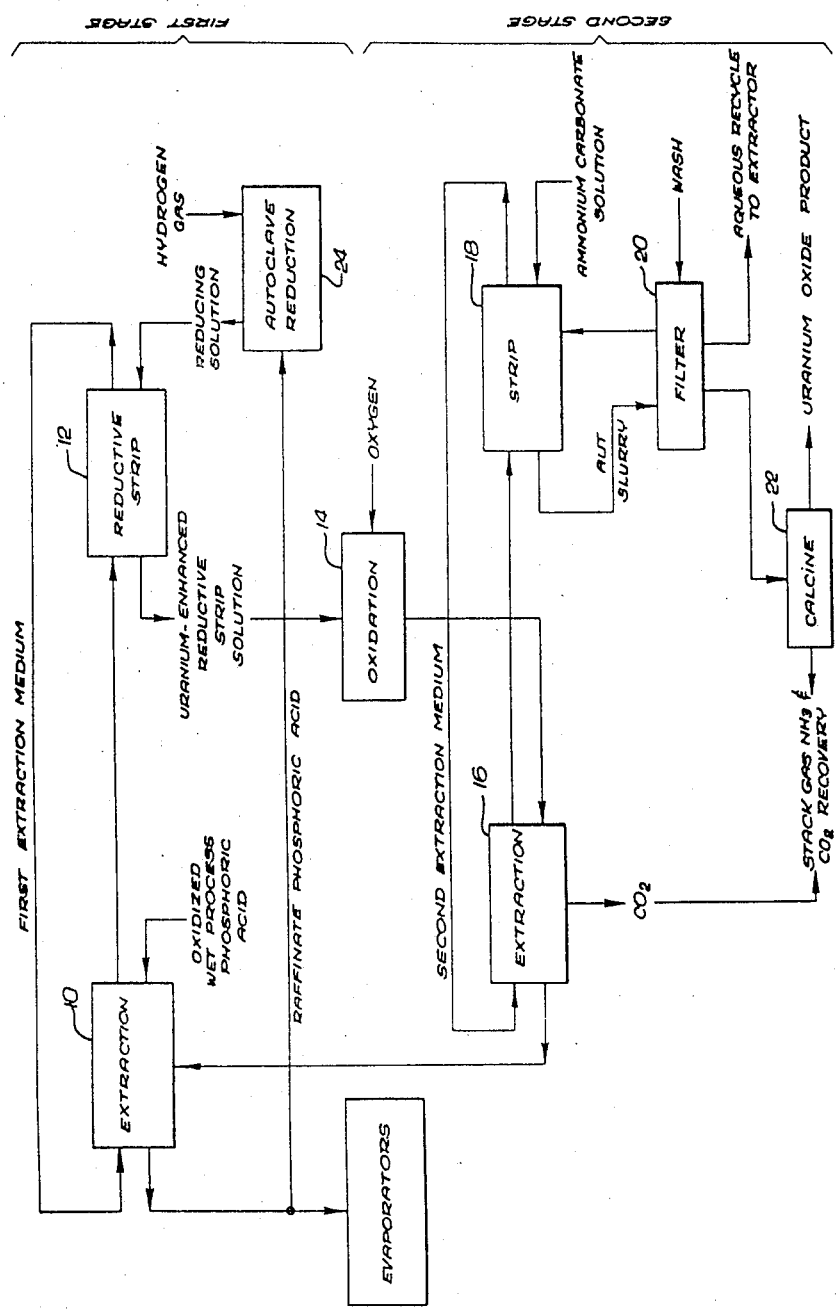

GASEOUS REDUCTION OF PHOSPHORIC ACID

This application is a continuation-in-part of copending application Ser. No. 349,026, filed Feb. 16, 1982, now U.S. Pat. No. 4,461,746.

BACKGROUND OF THE INVENTION

This invention relates generally to reducing ionic species present in phosphoric acid in an oxidized state, and more particularly in a process for recovering uranium, to providing reduced ferrous and other ions without contaminating the uranium-containing solution with undesirable impurity elements such as excess iron.

Phosphates for use in the fertilizer industry are obtained by mining phosphate-bearing rock and then converting the rock to an agriculturally useful fertilizer product by one of several alternative processes. In one of these processes, the "wet process", the mined rock is digested in sulfuric acid to produce dilute phosphoric acid and then concentrated to product grade phosphoric acid by evaporation. The phosphate-bearing rock may contain several kinds of metallic elements in relatively low concentration which are also dissolved into the phosphoric acid, and these metallic elements may be removed from the acid either as valuable by-products or as undesirable contaminants.

Depending upon the specific type of phosphate rock, uranium may be present in the dilute wet-process phosphoric acid in an amount sufficient to warrant recovery of the uranium for use in the nuclear industry Several processes for recovering uranium from wet process phosphoric acid are known, and in one such process disclosed in U.S. Pat. No. 3,711,591 the chemical properties of various oxidation states of the uranium ion are utilized to allow extraction of the uranium values by contacting the phosphoric acid with particular extractants dissolved in solvent. This process functions more efficiently if the uranium content in the input feed is initially concentrated in a first stage, wherein the extractant in the organic solvent extracts uranium values from the wet-process phosphoric acid having a very low uranium concentration, and then transfers the uranium values to a uranium-enhanced reductive strip solution which serves as the input to the second stage of the recovery process. The iron is extracted together with the uranium in the second stage, and the extracted iron contaminates the concentrated uranium oxide product, acting to complicate the subsequent purification of the uranium oxide product into a form usable in the nuclear industry. To overcome this problem of increased iron concentrations in the uranium-enhanced reductive strip solution, processes have been developed wherein the iron is removed prior to the second stage extraction by precipitation, or the second stage extraction process itself may be modified to avoid extraction of the iron. In either approach to removing the iron, there are economic disadvantages in that costly chemicals or expensive capital equipment is required. Some other processes for recovering uranium, while differing in approach, also depend upon solid iron additions and consequently suffer from the same problem of iron contamination.

Accordingly, there has been a need for an alternative approach to providing phosphoric acid having the positive ions therein in reduced valence states, and the need is particularly acute for processes for recovering uranium from phosphoric acid. Preferably, the improved process would allow utilization of the same basic process approach as the existing processes for recovering uranium from wet process phosphoric acid, which have been proved to be reasonably efficient. The present invention fulfills this need, and further provides related advantages.

SUMMARY OF THE INVENTION

The present invention resides in a process for providing phosphoric acid with positive ions therein in a reduced valence state. In several existing basic processes using phosphoric acid, iron metal is added to the acid to reduce the ferric ions in the acid, with the result that some of the solid iron dissolves and contaminates the final product unless removed by further processing steps. With the process of the present invention; the reduced ions are provided without the addition of metallic iron or other contaminant, avoiding the costly further step of removal of the excess iron required in the conventional processes.

In accordance with the invention, phosphoric acid containing ferric or other ions of highly oxidized valence state are heated in contact with a reducing gas to reduce the ions to lower valence states. The process of the invention may be used with any of several uranium recovery processes, but the application will be herein discussed in detail in relation to the presently preferred process disclosed in U.S. Pat. No. 3,711,591. Such detailed discussion is not intended to limit the invention to this one application, however, nor is it limited to reduction of ferric ions only.

In accordance with the application of the invention to the specific process of U.S. Pat. No. 3,711,591, raffinate phosphoric acid, produced by a first-stage extraction and containing a low concentration of ferric ions, is heated in contact with a reducing gas to reduce the positive ions therein to lower valence states. The resulting reducing solution serves as a source of reduced ions in a reductive strip of the first stage, wherein uranyl ions are reduced to uranous ions and transferred from the extractant and organic solvent to the aqueous uranium-enhanced reductive strip solution. In the presently preferred embodiment, the raffinate phosphoric acid is heated in contact with pressurized hydrogen gas in an autoclave to accomplish the reduction of the reduced ions, preferably at a pressure of up to about 15 atmospheres hydrogen are at a temperature of from about 150° F. to about 450° F., and most preferably at a pressure of from about, 3 to about 7 atmospheres hydrogen gas and a temperature of from about 25° F. to about 300° F., for a period of time of about 5 to about 15 minutes. Other reducing gasses such as sulfur dioxide, carbon monoxide, methane, and hydrogen sulfide may also advantageously be used. Ferrous iron as well as other oxidized ions present in the acid are reduced by the reducing gas and may be used in subsequent processing steps.

No excess iron metal or other solid reducing agent is introduced into the raffinate phosphoric acid to accomplish the reduction of the ions, so that the uranium-enhanced reductive strip solution produced by the reductive strip has a relatively low concentration of iron and other impurities, thereby reducing the subsequent refinement requirements in processing the uranium found in the uranium-enhanced reductive strip solution to a final commercially usable uranium product. In its most commercially practical form, the second-stage process undesirably strips iron impurities into the final uranium product of this process, thereby contaminating the final product with a proportion of any iron metal found in the uranium-enhanced reductive strip solution. Therefore, accomplishing the reduction of the positive ions with a reducing gas rather than a solid reducing agent significantly enhances the products.

It will be appreciated from the foregoing that the present invention represents an advance in the field of processes for recovering uranium from phosphoric acid. With this improvement, the necessary ferrous and other ions in a reduced valence state required to reduce uranyl ions are provided without introducing any iron impurity, which is otherwise present to contaminate the final uranium product.

Other features and advantages of the present invention will become apparent from the following more detailed description, taken in conjunction with the accompanying drawing, which illustrates, by way of example, the principles of the invention.

BRIEF DESCRIPTION OF THE DRAWING

The FIGURE is a schematic flow diagram of a two-stage reductive stripping process for recovering uranium from wet process phosphoric acid, illustrating the reduction of positive oxidized ions by pressurized hydrogen gas in the first stage, in accordance with a preferred embodiment of the present invention.

DETAILED DESCRIPION OF THE PREFERRED EMBODIMENT

As shown in the FIGURE for purposes of illustrating the presently preferred embodiment, the presently preferred embodiment of the present invention is concerned with a two-stage reductive stripping process for recovering uranium from wet process phosphoric acid and, more particularly, a step in the first stage of this process wherein reduced positive ions must be created for introduction into a reductive strip. In the first stage of this process, a uranium-enhanced reductive strip solution having an enhanced uranium concentration is produced from oxidized wet-process phosphoric acid having a low concentration of uranium by an extraction 10 of a portion of the uranium content into a first extraction medium, and a subsequent reductive strip 12 of this extraction medium by reaction with positive ions in a reduced valence state. The uranium-enhanced reductive strip solution is then treated by an oxidation 14 and introduced into a second-stage extraction 16 and subsequent strip 18, wherein the stripped uranium output is of sufficient concentration that it may be filtered by a filter 20 and calcined in a calcine unit 22 to produce a uranium oxide product.

A single-stage stripping process for producing uranium product from wet process phosphoric acid operates somewhat inefficiently because of the very low uranium concentration typically found in wet process phosphoric acid. As described in detail in U.S. Pat. No. 3,711,591, a two stage reductive stripping process was devised, wherein the extraction 10 and the reductive strip 12 of the first stage concentrated the uranium in the input flow to the second stage to an extent that the extraction 16 and the strip 18 may operate more efficiently, thereby raising the overall extraction efficiency of the process.

Briefly, oxidized wet-process phosphoric acid having the uranium in the oxidized uranyl ion form is introduced into the extraction 10, wherein a portion of the uranyl ions are extracted into the first extraction medium, which carries the uranyl ions to the reductive strip 12. The uranium-depleted raffinate phosphoric acid passes to evaporators 13 for use in agricultural fertilizer production. A small fraction of the raffinate phosphoric acid is diverted, processed to reduce the ferric ions therein to the ferrous state, and introduced as reducing solution into the reductive strip 12 to serve as a source of ferrous ions to reduce the uranyl ions in the extraction medium to the uranous state, in which oxidation state the uranous ions are rejected from the first extraction medium into the aqueous reducing solution to produce a uranium-enhanced reductive strip solution. (As used herein, the term "ferrous" denotes iron ions in the $+2$ oxidation state, the term "ferric" denotes iron ions in the $+3$ oxidation state, the term "uranyl" denotes uranium ions in the $+6$ oxidation state, and the term "uranous" denotes uranium ions in the $+4$ oxidation state. Further, the term "oxidize" refers to increasing the valence state of a positive ion, while "reduce" refers to decreasing the valence state of a positive ion).

In the second stage, the uranium-enhanced reductive strip solution output of the first stage is oxidized by oxygen gas in the oxidation 14, to convert the uranous ions therein to the uranyl state, and then introduced into the extraction 16 wherein the uranyl ions are transferred to a second extraction medium and the depleted oxidized reductive strip solution is recycled into the first extraction 10. The second extraction medium transfers the uranium values to the second-stage strip 18, wherein the uranyl ions are stripped from the second extraction medium by a reaction with ammonium carbonate solution to recover the uranium values as ammonium uranyl tricarbonate (AUT). The AUT slurry is then washed, filtered and calcined to yield a uranium oxide final product suitable for further treatment to produce purified uranium for use in the nuclear industry. Gasses from the extraction 15 and the calcine 22 are vented as stack gas, and aqueous waste from the filter 20 is cleaned in an extractor.

The extraction medium used in both the first-stage extraction and the second-stage extraction should be one that extracts uranyl ion from and gives up uranous ion to an aqueous phase. As disclosed in U.S. Pat. No. 3,711,591, an example of a satisfactory extraction medium is di (2-ethylhexyl) phosphoric acid and trioctylphosphine oxide dissolved in an organic diluent.

In accordance with the invention and as illustrated for the presently preferred autoclave reduction with hydrogen gas, in the first stage ferric and other oxidized positive ions in the diverted raffinate phosphoric acid are reduced to their reduced states required for the reductive strip 12 by an autoclave reduction 24. The diverted raffinate phosphoric acid is introduced into an autoclave pressure vessel and heated under hydrogen gas pressure, with continuous agitation. The reduction of ferric and other oxidized positive ions therein by hydrogen should proceed until a concentration of reduced ions sufficient for the reductive strip is obtained. In typical commercial-scale operation of the two-stage reductive stripping process described in U.S. Pat. No. 3,711,591 the oxidized wet-process phosphoric acid flows at 1000 l/min and gives up 0.07 g U/l to the first extraction medium, the first extraction medium flows at 500 l/min., and 6 l/min of raffinate phosphoric acid is withdrawn for introduction into the reductive strip. To effect the reductive strip under these conditions, a concentration of ferrous ions of about 5 to about 20 grams per liter in the reducing solution is required, or an equivalent amount of ferrous and other reduced species. Although the reduction of the oxidized positive ions by hydrogen will proceed more rapidly with increasing pressures of hydrogen, as a practical matter a maximum hydrogen pressure of about 7 atmospheres is utilized to avoid the capital expense of providing a high-pressure autoclave. Preferably, the raffinate phosphoric acid is heated to a temperature of from about 150° F. to about 450° F. with a hydrogen pressure of from about 1 to about 15 atmospheres. Most preferably, the raffinate phosphoric acid is heated to a temperature of from about 250° F. to about 300° F., with a hydrogen pressure of from about 3 to about 7 atmospheres for a time of from about 5 to about 15 minutes. Under these conditions, as an Example will demonstrate, the autoclave reduction 24 will provide the necessary concentration of reduced species.

The following Example will serve to illustrate the inventive method:

EXAMPLE

Eleven liters of 30% $P_2O_5$ phosphoric acid was introduced into a mechanically agitated pressure vessel serving as an autoclave and heated to 295° F. under 6 atmospheres of hydrogen gas pressure to effect reduction of the oxidized positive ions in the phosphoric acid to their respective reduced states. Samples of the acid were taken at predetermined time intervals up to 2 hours and titrated using 0.02M ceric ammonium acid sulfate solution to determine the oxidation requirement. The titration analyses of the acid samples are summarized in the following table:

| Time (Minutes) | Meq/L Oxidation Requirement | Grams/L Ferrous Iron | Emf of Acid (SCE) |
|---|---|---|---|
| 0 | 77.0 | 4.3 | 191 |
| 5 | 110.2 | 6.2 | 190 |
| 15 | 189.7 | 10.6 | 133 |
| 20 | 213.4 | 11.9 | 13 |
| 30 | 223.6 | 12.5 | −152 |
| 45 | 244.2 | 13.6 | −171 |
| 60 | 249.0 | 13.0 | −188 |
| 75 | 267.8 | 15.0 | −196 |
| 120 | 284.6 | 15.9 | −199 |

In about 5-15 minutes, the hydrogen reduction produces an acid having a sufficient concentration of reduced species for use in a reducing solution to strip the uranyl ions from the extraction medium in the first stage. As seen from the table, after about 20-30 minutes the reduction reaction has proceeded essentially to completion under the combination of pressure and temperature used in the Example, and further reduction is not economically justified in commercial processing.

Those skilled in the art will recognize that other positive ions in addition to iron are reduced by the gaseous reduction, as will be described more fully below. The principal requirement of the gaseous reduction is that a sufficient total concentration of reduced species of all types be available in the acid raffinate for subsequent stripping of the uranyl ions, and such total concentration is expressed as the Meq/L Oxidation Requirement in the Table. However, it is sometimes a convention to convert the Oxidation Requirement to a Grams/L ferrous iron for purposes of data presentation and discussion, as in the third column. Use of this latter concentration is not to be interpreted to mean that iron is the only reduced species, however, since reduction of other species is ordinarily required to provide a sufficient concentration of reduced species.

The present invention may also be advantageously applied to other processes for recovering uranium from wet-process phosphoric acid, such as the Gardiner OPPA uranium extraction process. In this process, uranium is extracted from pretreated phosphoric acid using octyl pyrophosphoric acid (OPPA) in a carrier. Pretreatment of the acid includes the addition of iron or steel turnings to the phosphoric acid to reduce uranyl ions therein to the uranous valance state. As with the process previously described, the solid iron addition contaminates the final product, so that reduction of the uranyl ions by heating in a pressurized reducing gas offers the same advantages as described above. In yet another example, the present invention may be similarly advantageously applied to the process described in U.S. Pat. No. 4,241,027.

Further, while the present invention has been described in detail for embodiments wherein iron ions are one species reduced by heating the phosphoric acid in a pressurized reducing gas, the application of the present invention to reduce other ions in the acid is also contemplated. For example, ions of the higher oxidation states of the following elements present in phosphoric acid are reduced by heating the acid in pressurized hydrogen gas: titanium, vanadium, chromium, manganese, iron, cobalt, nickel, copper, germanium, molybdenum, tin, antimony, tellurium, tungsten, rhenium, tantalum, cerium, ytterbium, thallium, and even uranium directly. Other group IV - group VII ions present in the acid in trace amounts are also reduced. Thus, by use of the invention, phosphoric acid containing a wide variety of positive ions in reduced valence states may be supplied for further processing.

It will now be appreciated that, through the use of this invention, phosphoric acid having positive ions in reduced valence states may be prepared without contamination by nongaseous reducing agents. In the preferred embodiment and application, the necessary concentration of ferrous and other reduced positive ions may be produced in raffinate phosphoric acid to effect the reductive strip of the first stage in a two-stage process for reductive stripping to recover uranium from wet process phosphoric acid. The reduction of the ions is accomplished by a reducing gas rather than the introduction of iron metal, which, if used, would eventually be extracted into the final uranium oxide product and act as a contaminant to reduce the efficiency of further refinement steps. Hydrogen gas is the presently preferred reducing gas for use in all of the embodiments of this invention, but other reducing gasses, such as sulfur dioxide, carbon monoxide, methane, and hydrogen sulfide, and combinations thereof, also may be used. Although a particular embodiment of the invention has been described in detail for purposes of illustration, various modifications may be made without departing from the spirit and scope of the invention. Accordingly, the invention is not to be limited except as by the appended claims.

We claim:

1. A process for reducing the valence state of ions in phosphoric acid, for use with a process for recovering uranium from phosphoric acid, comprising the step of:

heating a solution of phosphoric acid containing ferric ions in the presence of a reducing gas to reduce ferric ions present in the solution to ferrous ions, thereby avoiding the introduction of a contaminant reducing agent.

2. The process step of claim 1, where the reducing gas is hydrogen.

3. The process step of claim 1, wherein said heating step is accomplished in an autoclave under an imposed pressure of hydrogen.

4. The process of claim 1, wherein said heating step is accomplished in an autoclave pressurized to up to about 15 atmospheres of hydrogen gas, at a temperature of from about 150° F. to about 450° F.

5. The process of claim 1, wherein said heating step is accomplished in an autoclave pressurized to from about 3 to about 7 atmospheres of hydrogen gas, at a temperature of from about 250° F. to about 300° F. for a period of time of from about 5 to about 15 minutes.

6. The process of claim 1, wherein said reducing gas is selected from the group consisting of sulfur dioxide, carbon monoxide, methane, and hydrogen sulfide and mixtures thereof.

7. A process for producing phosphoric acid having positive ions therein in a reduced valence state, comprising the steps of:
   providing phosphoric acid solution having a concentration of oxidized positive ions therein; and
   heating the oxidized phosphoric acid solution in the presence of a pressurized reducing gas to reduce the valence state of at least some of the positive ions therein.

8. The process of claim 7, wherein said reducing gas is hydrogen.

9. The process of claim 7, wherein said reducing gas is selected from the group consisting of sulfur dioxide, carbon monoxide, methane, and hydrogen sulfide and mixtures thereof.

10. The process of claim 7, wherein the ions are ions of the element uranium.

11. The process of claim 7, wherein the ions are ions of elements selected from the group consisting of titanium, vanadium, chromium, manganese, iron, cobalt, nickel, copper, germanium, molybdenum, tin, antimony, tellurium, tungsten, rhenium, tantalum, cerium, ytterbium and thallium.

* * * * *